(12) United States Patent
Odhner

(10) Patent No.: US 7,233,394 B2
(45) Date of Patent: Jun. 19, 2007

(54) COMPACT SPECTROMETER

(75) Inventor: Jefferson E. Odhner, Amherst, NH (US)

(73) Assignee: Luckoff Display Corporation, Columbus, OH (US)

( * ) Notice: Subject to any disclaimer, the term of this patent is extended or adjusted under 35 U.S.C. 154(b) by 79 days.

(21) Appl. No.: 11/156,424

(22) Filed: Jun. 20, 2005

(65) Prior Publication Data

US 2006/0285109 A1  Dec. 21, 2006

(51) Int. Cl.
*G01J 3/28* (2006.01)
*G01J 3/06* (2006.01)

(52) U.S. Cl. ...................... 356/328; 356/308
(58) Field of Classification Search ............. 356/308, 356/328, 334
See application file for complete search history.

(56) References Cited

U.S. PATENT DOCUMENTS

| | | | |
|---|---|---|---|
| 2,723,589 A * | 11/1955 | Bullock et al. ............ 356/308 |
| 3,572,933 A | 3/1971 | Boostrom |
| 3,578,866 A | 5/1971 | Kohler et al. |
| 3,625,615 A | 12/1971 | Wilson |
| 3,680,957 A | 8/1972 | Fukuda |
| 3,733,131 A | 5/1973 | Mould |
| 3,775,010 A | 11/1973 | Chupp et al. |
| 3,888,590 A | 6/1975 | White |
| 3,911,276 A | 10/1975 | Bell |
| 3,917,403 A | 11/1975 | Chupp et al. |
| 3,923,399 A | 12/1975 | Brumley |
| 4,025,196 A | 5/1977 | Chupp et al. |
| 4,043,670 A | 8/1977 | Kozlov et al. |
| 4,203,669 A | 5/1980 | Maeda et al. |
| 4,225,233 A * | 9/1980 | Ogan ...................... 356/308 |
| 4,310,244 A | 1/1982 | Perkins et al. |
| 4,315,691 A | 2/1982 | Perkins et al. |
| 4,441,815 A | 4/1984 | Izumi |
| 4,469,441 A | 9/1984 | Bernier et al. |
| 4,553,253 A | 11/1985 | Petersen |
| 4,573,793 A | 3/1986 | Sasaki |
| 4,613,233 A | 9/1986 | Wilson |
| 4,623,251 A | 11/1986 | Pouey |
| 4,643,572 A | 2/1987 | Sonobe et al. |

(Continued)

FOREIGN PATENT DOCUMENTS

EP              506063           9/1992

(Continued)

*Primary Examiner*—F. L. Evans
(74) *Attorney, Agent, or Firm*—Mueller Smith & Matt

(57) ABSTRACT

The present invention is directed to method and apparatus for measuring the spectral characteristics of an object from a formed object generated input signal. The method comprises the steps of directing the input signal onto a diffraction grating. Diffracted signals are directed to a resonant mirror assembly for sequentially focusing a select diffracted signal. From that focused select diffracted signal, a spectral characteristic of said object is determined. Each said spectral characteristic is associated with each corresponding focused select diffracted signal and the associated signals are published. The apparatus is an improved spectrometer comprising a fiber cable assembly for receiving an object generated input signal and a diffraction grating. A resonant mirror assembly sequentially focuses a select diffracted signal, a sensor sensing which diffracted signal has been focused from the diffraction grating. An analyzer coupled with the sensor determines a spectral characteristic of the object from said select diffracted signal.

20 Claims, 3 Drawing Sheets

U.S. PATENT DOCUMENTS

| | | | |
|---|---|---|---|
| 4,652,761 A | 3/1987 | Kerr et al. | |
| 4,697,924 A | 10/1987 | Akiyama | |
| 4,705,396 A | 11/1987 | Bergstrom | |
| 4,717,254 A | 1/1988 | Masuda | |
| 4,752,129 A * | 6/1988 | Izumi et al. | 356/328 |
| 4,752,130 A | 6/1988 | George et al. | |
| 4,776,696 A | 10/1988 | Hettrick et al. | |
| 4,830,493 A | 5/1989 | Giebeler | |
| 4,832,491 A | 5/1989 | Sharpe et al. | |
| 4,919,537 A | 4/1990 | Giebeler | |
| 4,921,350 A | 5/1990 | Giebeler | |
| 4,973,159 A | 11/1990 | Sohma et al. | |
| 4,995,724 A | 2/1991 | Sonobe et al. | |
| 5,078,495 A | 1/1992 | Harada et al. | |
| 5,080,486 A | 1/1992 | Shirasaki et al. | |
| 5,123,740 A | 6/1992 | Giebeler, Jr. | |
| 5,192,981 A | 3/1993 | Slutter et al. | |
| 5,223,913 A | 6/1993 | Ando et al. | |
| 5,231,462 A | 7/1993 | Dschen | |
| 5,233,405 A | 8/1993 | Wildnauer et al. | |
| 5,257,086 A | 10/1993 | Fateley et al. | |
| 5,285,254 A | 2/1994 | De Sa | |
| 5,359,409 A | 10/1994 | Wildnauer et al. | |
| 5,424,826 A | 6/1995 | Kinney | |
| 5,457,530 A | 10/1995 | Nagai | |
| 5,497,231 A * | 3/1996 | Schmidt | 356/334 |
| 5,504,575 A | 4/1996 | Stafford | |
| 5,528,364 A | 6/1996 | Koike | |
| 5,532,818 A | 7/1996 | Tokumoto | |
| 5,557,404 A | 9/1996 | Matsui et al. | |
| 5,570,180 A | 10/1996 | Nagai | |
| 5,631,735 A | 5/1997 | Nagai | |
| 5,657,121 A | 8/1997 | Nishina | |
| 5,689,334 A | 11/1997 | Atkinson et al. | |
| 5,710,627 A | 1/1998 | Inoue et al. | |
| 5,747,807 A | 5/1998 | Atkinson et al. | |
| 5,748,310 A | 5/1998 | Fujiyoshi | |
| 5,767,966 A | 6/1998 | Iwasaki | |
| 5,784,159 A | 7/1998 | Iwasaki | |
| 5,825,484 A | 10/1998 | Iwasaki | |
| 5,828,061 A | 10/1998 | Kakimoto | |
| 5,841,533 A | 11/1998 | Adkinson | |
| 5,844,681 A | 12/1998 | Alessi et al. | |
| 5,880,833 A | 3/1999 | Iwasaki | |
| 5,917,188 A | 6/1999 | Adkinson et al. | |
| 5,923,420 A | 7/1999 | Iwasaki | |
| 5,949,541 A | 9/1999 | Merle | |
| 6,038,024 A | 3/2000 | Berner | |
| 6,128,078 A | 10/2000 | Fateley | |
| 6,166,805 A | 12/2000 | Mori et al. | |
| 6,271,917 B1 | 8/2001 | Hagler | |
| 6,317,203 B1 | 11/2001 | Wakabayashi et al. | |
| 6,362,878 B1 | 3/2002 | Wang et al. | |
| 6,411,382 B1 | 6/2002 | Nishina | |
| 6,441,900 B1 | 8/2002 | Fujiyoshi | |
| 6,452,674 B1 | 9/2002 | Fujiyoshi | |
| 6,549,281 B2 | 4/2003 | Tokumoto | |
| 6,583,873 B1 | 6/2003 | Goncharov et al. | |
| 6,587,198 B2 | 7/2003 | Olshausen | |
| 6,597,452 B1 | 7/2003 | Jiang et al. | |
| 6,633,380 B1 | 10/2003 | Mori et al. | |
| 6,643,011 B2 | 11/2003 | Kojima | |
| 6,646,739 B2 | 11/2003 | Kaneko | |
| 6,657,724 B1 | 12/2003 | Dunstan et al. | |
| 6,678,044 B2 | 1/2004 | Kaneko | |
| 6,683,686 B2 | 1/2004 | Weigold et al. | |
| 6,710,330 B1 | 3/2004 | Tagami et al. | |
| 6,712,473 B2 | 3/2004 | Kurematsu | |
| 6,714,298 B2 | 3/2004 | Ryer | |
| 6,744,505 B1 | 6/2004 | Wang et al. | |
| 6,744,506 B2 | 6/2004 | Kaneko et al. | |
| 6,762,833 B2 | 7/2004 | Hagler | |
| 2001/0019408 A1 | 9/2001 | Hagler | |
| 2001/0019410 A1 | 9/2001 | Kojima | |
| 2001/0046047 A1 | 11/2001 | Ryer | |
| 2002/0001081 A1 | 1/2002 | Tokomoto | |
| 2002/0008873 A1 | 1/2002 | Kaneko | |
| 2002/0044280 A1 | 4/2002 | Weigold et al. | |
| 2002/0057431 A1 | 5/2002 | Fateley et al. | |
| 2002/0113962 A1 | 8/2002 | Kojima | |
| 2002/0126278 A1 | 9/2002 | Olshausen | |
| 2002/0186371 A1 | 12/2002 | Kaneko et al. | |
| 2003/0007148 A1 | 1/2003 | Moon et al. | |
| 2003/0011769 A1 | 1/2003 | Rakuljic et al. | |
| 2003/0016355 A1 | 1/2003 | Koike et al. | |
| 2003/0043373 A1 | 3/2003 | Russell | |
| 2003/0067601 A1 | 4/2003 | Asami et al. | |
| 2003/0081208 A1 | 5/2003 | Kaneko et al. | |
| 2003/0142308 A1 | 7/2003 | Koima et al. | |
| 2004/0036027 A1 | 2/2004 | Horton et al. | |
| 2004/0057049 A1 | 3/2004 | Bruch et al. | |

FOREIGN PATENT DOCUMENTS

| | | |
|---|---|---|
| JP | 5714539 | 9/1982 |
| JP | 58131522 | 8/1983 |
| JP | 59079124 | 5/1984 |
| JP | 59180440 | 10/1984 |
| JP | 60111125 | 6/1985 |
| JP | 60177227 | 9/1985 |
| JP | 60231123 | 11/1985 |
| JP | 62289737 | 12/1987 |
| JP | 63187125 | 8/1988 |
| JP | 01314927 | 12/1989 |
| JP | 2231536 | 9/1990 |
| JP | 4015529 | 1/1992 |
| JP | 4190123 | 7/1992 |
| JP | 6011391 | 1/1994 |

* cited by examiner

COMPACT SPECTROMETER

CROSS-REFERENCE TO RELATED APPLICATIONS

STATEMENT REGARDING FEDERALLY SPONSORED RESEARCH

Not applicable.

BACKGROUND OF THE INVENTION

Devices currently exist for conducting spectral analysis. One such device is the monochromator. As described in U.S. Pat. No. 3,888,590, a monochromator includes an entrance slit for admitting light from a source, a collimator such as a mirror, a diffraction grating or other dispersing element and a telescope mirror for forming a substantially monochromatic image of the entrance slit. Light entering the entrance slit is reflected by the collimator, is dispersed into a spectrum by the dispersing element, and is reformed into the dispersed image by the telescope so that by positioning a receiving element such as an exit slit relative to the dispersed element, a selected portion of the spectrum is obtained. In these devices, the dispersing element customarily is movable relative to the other optical components in order to change the angle of the light and thereby produce dispersed images of different portions of the spectrum. It also should be noted that components of these devices are configured such that the light path is generally M-shaped. One of the disadvantages of these devices is that relatively complex and/or expensive mechanisms are required for scanning the spectrum.

Another optical device for reproducing portions of the spectrum utilizes multiple monochromatic light sources, each of a different wavelength. A disadvantage of this approach is that each light source must be calibrated to ensure that the light output has the wavelength desired. The device also is relatively expensive.

Another disadvantage of certain optical devices is the use of a linear CCD, which incorporates a plurality of detectors, each of which detects energy of a particular wavelength. While such a component provides an efficient solution for simultaneously detecting a plurality of energy signals, its cost is much greater than that of a detector that can detect only a single signal at any given time.

BRIEF SUMMARY OF THE INVENTION

The present invention is directed to an improved spectrometer and method for measuring the spectral characteristics of an object. The improved spectrometer comprises a fiber cable assembly for receiving an object generated input signal. A diffraction grating is positioned to receive that input signal and forms diffracted signals. A resonant mirror assembly is provided for sequentially focusing a select diffracted signal from the diffraction grating. A sensor senses each focused select diffracted signal, and an analyzer determines a spectral characteristic of the object from the focused select diffracted signal. The analyzer is coupled with the sensor for associating the sensed select diffracted signal with the spectral characteristic. This spectrometer is relatively inexpensive to produce and its compact size enables it to be used for a plethora of scientific and industrial applications.

The method comprises the steps of directing the input signal onto a diffraction grating. Diffracted signals are directed to a resonant mirror assembly for sequentially focusing a select diffracted signal. From that focused select diffracted signal, a spectral characteristic of said object is determined. Each said spectral characteristic is associated with each corresponding focused select diffracted signal and the associated signals are published.

BRIEF DESCRIPTION OF THE DRAWINGS

For a fuller understanding of the nature and advantages of the present invention, reference should be had to the following detailed description taken in connection with the accompanying drawings, in which.

DETAILED DESCRIPTION OF THE INVENTION

Figure 1:
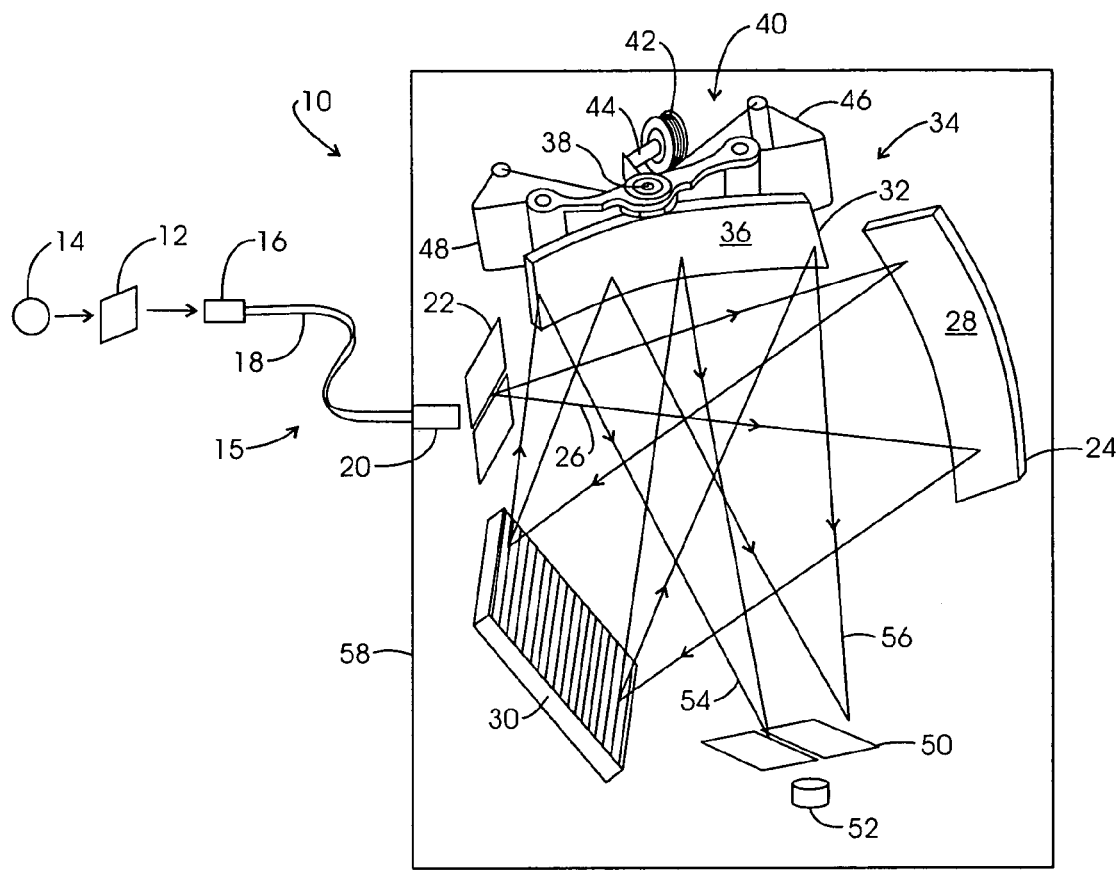
FIG. 1 is a perspective view of the improved spectrometer of the invention.

The present invention is directed to a compact spectrometer and method for determining the optical characteristics of an object. The optical characteristics to be determined include, for example, reflectivity, transmissivity, or absorbability. Knowing the optical characteristics of an object is advantageous for any number of practical applications. For example, a user may desire to know the color of items such as paint, fabric, glass, hair coloring, etc. For color matching applications, the object may be a painted wall, a piece of furniture, a rug, a set of drapes, an article of clothing, a glass window, a painted automobile fender, hair, etc. Because the reflectivity of a plant leaf is indicative of the health of the plant, the object also may be a plant leaf. The spectrometer may be used in a factory for quality control of inventory. For example, the apparatus may be used to compare the "whiteness" of newspaper. Reflectivity also may be used to characterize solar reflecting glass, transmission of sunglasses, specialized mirrors and many other materials.

The optical characteristic of interest for the examples cited above is reflectivity. The spectrometer of the present invention also can be used to determine transmissivity. For example, the object may be an optical filter whose bandwidth is to be determined. Looking at an output of amplitude of reflected energies versus wavelength, a user can surmise that when the amplitude at a particular wavelength is zero, the filter passed that wavelength. Thus, the output informs the user as to which wavelengths were transmitted or filtered and which wavelengths were not. Transmissivity is relevant in characterizing optical filters, camera lenses, fiber optics, and many other materials.

Absorption is another measurable characteristic. Knowing the absorption characteristics of a material may be relevant in identifying elements such as the chemical components of a mixture or the types of gases in the atmosphere. Absorption also is relevant for analyzing fluids in the medical field.

The above are simply a few examples of the many applications in which the present invention may be employed.

Another advantage of the present invention is the use of a resonant mirror assembly. Resonant mirror assemblies, such as that described above, are known for use in bar code scanning applications and currently can be purchased off-the-shelf for between about US $7.00 to about US $22.00. Thus, the improved spectrometer can be produced at a fraction of the cost of existing spectrometers. Use of this component also enables a spectrometer component arrangement that results in an overlapping light path having a folded-M configuration, which is more compact than other spectral measuring devices, such as the Ebert monochromator whose light path has an M-shaped configuration. Using a resonant mirror assembly and positioning the components as described, spectrometer 10 may be, for example, about 56 mm by about 88 mm by about 24 mm, which is about the size of a package of cigarettes. Despite its small size, the present embodiment has a resolution of between about 1 nm to about 2 nm.

FIG. 1 is a perspective view of the improved spectrometer of the present invention, which is shown generally at 10. Spectrometer 10 is shown positioned adjacent an object, 12, whose spectral characteristics are to be measured. In order to form an object generated input signal, object 12 is illuminated by an external source, 14. Light source 14 may be any source comprised of a plurality of wavelengths of energy, including, for example, a white light source, ambient light, flame, starlight, etc. Each wavelength of energy from light source 14 will be in whole or in part reflected, transmitted or absorbed by object 12. Light reflected and/or transmitted by object 12 enters spectrometer 10 via a fiber cable assembly, 15, which includes collection optics (e.g., a collection lens), 16, optical fiber 18, lens 20, and input slit 22. Collection lens 16 focuses that light onto optical fiber, 18, which carries the light to output lens 20, which may be a GRIN lens. Output lens 20 focuses the object generated light onto slit 22. A mode stripping aperture (not shown) may be provided between output lens 20 and input slit 22. Such an aperture acts as a spatial filter. The output of fiber cable assembly 15 is the above-noted object generated input signal.

After passing through input slit 22, input signal, 26, diverges onto a collimating mirror, 24. The reflective surface, 28, of collimating mirror 24 directs input signal, 26, onto a diffraction grating, 30. Diffraction grating 30 may be any conventional diffraction grating, such as an etched grating or a holographic diffraction grating. As the skilled artisan will appreciate, diffraction grating 30's spacing will determine the angular dispersion of the resulting spectrum. The grating spacing, thus, will be chosen to provide the desired resolution of the device. For example, diffraction grating 30 may be a luminized blaze grating having about 600 lines per mm. Using such a diffraction grating, spectrometer 10 has a resolution of between about 1 nm to about 2 nm.

Diffraction grating 30 disperses input signal 26 to form diffracted signals which are directed to the focusing resonant mirror, 32, of a resonant mirror assembly, shown generally at 34. As used herein, "diffracted signal" means a signal comprised of a single wavelength of energy or a range of wavelengths of energy. As will be discussed below, resonant mirror assembly 34 focuses a select diffracted signal from diffraction grating 30 onto an output slit 50 where it is detected by an analyzer 52, whose structure and function will be described in greater detail below.

Figure 2:
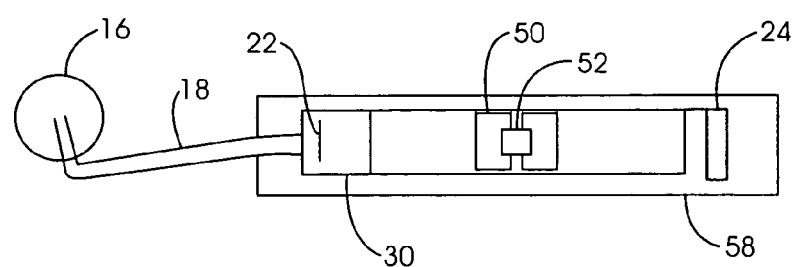
FIG. 2 is a side view taken through plane 2—2 in FIG. 1.

Lens 20, slit 22, collimating mirror 24, diffraction grating 30, resonant mirror assembly 34, output slit 50, and analyzer 52 are seen to be contained within a housing, 58. These components also are illustrated in FIG. 2, which is a side view taken along the plane 2—2 in FIG. 1. As noted above, spectrometer 10 is compact in size. Housing 58 may be about the size of a package of cigarettes.

Resonant mirror 32 is similar to the resonant mirror used in bar code scanners, such as that identified as the Symbol Technology LS 4008i Scanner including Mylar Motor Assembly (Part No. 21-60774-02), which is manufactured by Symbol Technologies, Inc. of Long Island, N.Y., except that its reflective plastic surface, 36, is replaced by a new gold-coated plastic piece with a curvature that focuses on output slit 50. Resonant mirror 32 pivots about a pivot point, 38. Oscillation of resonant mirror 32 about pivot point 38 is effected by a drive assembly indicated generally at 40. Drive assembly 40 includes a coil, 42, a magnet, 44, and a pair of plastic, flexed hinges, 46 and 48. Magnet 44 is fixed to pivot point 38 of resonant mirror 32. When drive assembly 40 has no drive voltage applied to coil 42, flexed hinges 46 and 48 cause mirror 32 to remain stationary in a nominal position midway between mirror 32's two pivot angle extremes. In order to move mirror 32, the drive signal in coil 42 must overcome the passive static force of hinges 46 and 48. In operation, a drive signal which changes polarity in a sinusoidal fashion is applied to coil 42. This creates a magnetic field which interacts with the fixed magnet 44 causing resonant mirror 32 to pivot or oscillate about pivot point 38. The frequency of the applied drive signal is determined by the mechanical resonance of resonant mirror assembly 34. For example, if resonant mirror assembly 34 has a relatively heavy weight, the resulting resonant frequency of resonant mirror assembly 34 would be relatively low or slow. On the other hand, the lighter the weight of resonant mirror assembly 34, the higher or quicker its resonant frequency. Oscillating resonant mirror assembly 34 at its resonant frequency requires the minimal amount of power. Resonant mirror assembly 34's resonant frequency also is its most stable operating frequency.

It should be noted that, any drive assembly or mechanism for oscillating mirror 32 may be used (e.g., linear actuator, stepper motor, etc.); however, a magnet/coil assembly such as that shown minimizes the energy input required to achieve the desired oscillation. An alternative mechanism comprising a conventional linear actuator, 43, and stepper motor, 44, is shown in FIG. 5.

As noted above, resonant mirror 32 of resonant mirror assembly 34 will focus a select diffracted signal to output slit, 50. In FIG. 1, the select diffracted signal directed to output slit 50 is illustrated at 54. In order to properly focus the diffracted signal onto output slit 50, surface 36 of mirror 32 will have an aspheric toroidal shape. All other diffracted signals, such as that shown at 56, will not pass through output slit 50 and will not be detected by analyzer 52. By oscillating resonant mirror 32, all of the diffracted signals will be sequentially directed to output slit 50 and sequentially detected by analyzer 52, which determines one or more spectral characteristics of the diffracted signals.

Figure 3:
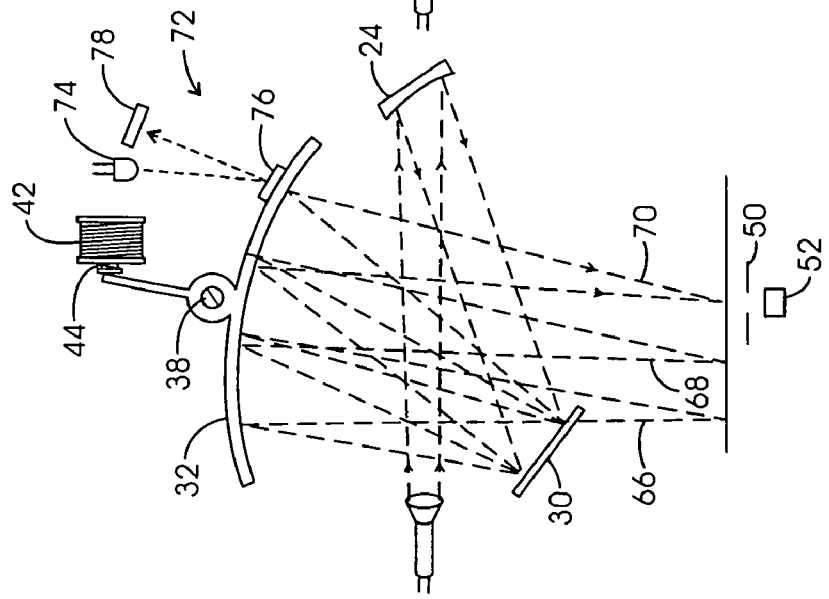
FIG. 3 is a simplified, overhead view of the spectrometer of FIG. 1 illustrating the mirror in a first position.
Figure 4:
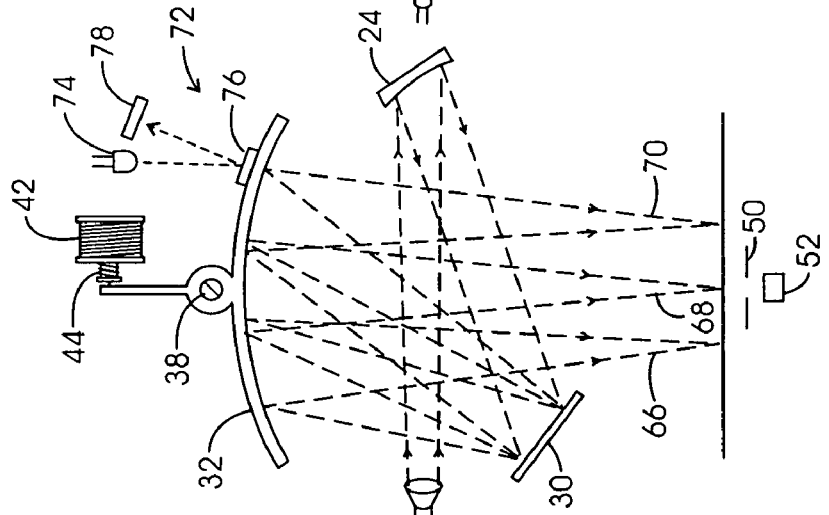
FIG. 4 is another overhead view of the spectrometer of FIG. 1 illustrating the mirror in a second position.
Figure 5:
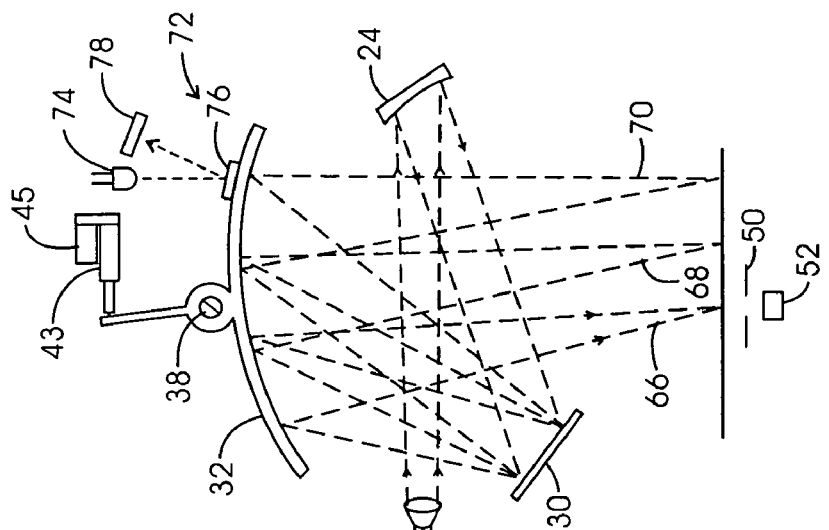
FIG. 5 is yet another overhead view of the spectrometer of FIG. 1 illustrating the mirror in a third position.

FIGS. 3–5 further illustrate the sequential focusing of diffracted signals to output slit 50. The number of positions and angles of rotation of the mirror are intended to be illustrative only and not limiting of the invention. FIG. 3 illustrates resonant mirror 32 in a first position. In this position, mirror 32 focuses diffracted signal 70 at output slit 50. In this position, diffracted signal 70 will be detected by analyzer 52. FIG. 4 illustrates mirror 32 in a second position.

In this position, diffracted signal 68 is focused on output slit 50, and will be detected by analyzer 52. In FIG. 5, resonant mirror 32 is shown in yet a third position. In this position, diffracted signal 66 is focused at output slit 50. When resonant mirror 32 is in this position, analyzer 52 will detect diffracted signal 66.

It is important that spectrometer 10 associate each focused diffracted signal with its corresponding spectral characteristics, which are determined by analyzer 52. These signals may be associated using a sensor, which may either be part of the analyzer or alternatively, may be a position detector assembly associated with resonant mirror assembly 34. For example, as illustrated above, the position of mirror 32 determines which diffracted signal is focused at output slit 50. Thus, by knowing or sensing the position of resonant mirror 32, the select diffracted signal also will be know. In order to determine the position or angle of mirror 32 relative to the output of diffraction grating 30, a second coil may be provided as part of resonant mirror assembly 34. This second coil interacts with magnet 44, which when driven by the first coil, creates an electro-motive force (EMF) to create a sinusoidal voltage that is proportional to the angle of resonant mirror 32 relative to the diffracted signals from diffraction grating 30. This voltage will indicate the position of the mirror, and thus which diffracted signal is focused at output slit 50. This signal is transmitted to analyzer 52. In order to maximize the compactness of spectrometer 10, coil 42 (FIG. 1) may consist of two windings on a single coil. For example, coil 42 may include two windings. One of these windings drives the magnet to cause mirror 32 to oscillate about pivot point 38. The other winding serves as a pick-up to monitor the position of mirror 32. Greater accuracy in determining the mirror's position may be achieved by providing a third adjacent coil on the same winding. In this way, i.e., by determining the position of mirror 32, resonant mirror assembly 34 senses which select diffracted signal is being focused on output slit 50 at a given point in time and informs analyzer 52 of that information. For example, that information will be the wavelength of the diffracted signal being focused at the output slit.

Figure 6:
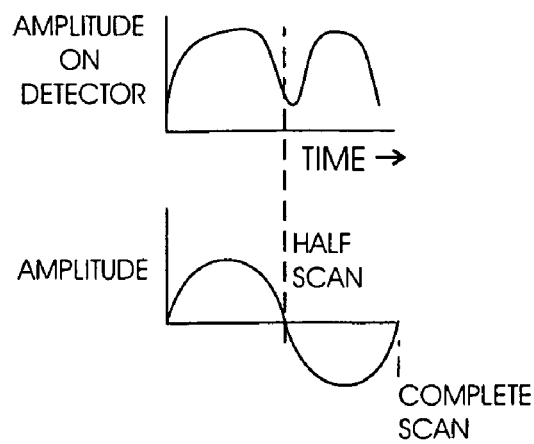
FIG. 6 is a graphic illustration of the output of one embodiment of the position detector assembly of the invention.

Another alternative for determining the position of the mirror is to use a position detector assmebly such as that illustrated at 72 in FIGS. 3-5. Position detector assembly 72 is seen to include a light emitting diode (LED), 74, a diffuse reflector, 76, and a photo-detector, 78. LED 74 emits a constant light energy onto diffuse reflector 76. Photo-detector 78 receives the reflected light from diffuse reflector 76. As the angular position of resonant mirror 32 changes, the signal on detector 78 changes proportionally. This signal is recorded. The amplitude of the signal will indicate the position of resonant mirror 32. If reflector 76 is biased at a slight angle, then the signal received by the detector also will be indicative of whether the mirror is angled to the right or left of center. Looking momentarily to FIG. 6, the change in amplitude of light detected by photo-detector 78 over time is graphically illustrated. The graph represents the change in amplitude of detected light over a single scan of mirror 32.

As noted above, analyzer 52 detects the select diffracted signals sequentially directed from diffraction grating 30 by resonant mirror assembly 34. Analyzer 52 analyzes, or processes, each diffracted signals and generates a corresponding output signal correlative to the spectral characteristics of the object. For example, analyzer 52 may include a detector which detects the amplitude or intensity of each selected diffracted signal focused at output slit 50. Analyzer 52 also receives the sensed diffraction grating signal from resonant mirror assembly 34, which identifies which diffracted signal is being focused at the output slit. Analyzer 52 associates the sensed select diffracted signal with its corresponding output signal.

Analyzer 52 may be comprised of a single component which performs all of the functions described above. Alternatively, analyzer 52 may be comprised of a plurality of components, each of which performs one or more of analyzer 52's functions. For example, analyzer 52 may comprise a detector for detecting signals, and a recorder, microprocessor, or the like for storing, processing data, and transmitting data. Analyzer 52 may include circuitry for amplifying received signals and for converting signals into a particular format, such as that conventional for transmission via a USB or FireWire port. By providing a USB or FireWire port, spectrometer 10 can be connected to a computer and signals converted to a USB or FireWire format may be transmitted to the computer where, with the appropriate software, the received data may be analyzed, stored, and displayed. Whether comprised of a single component or multiple components, analyzer 52 may be wholly or only partially contained within housing 58.

Figure 7:
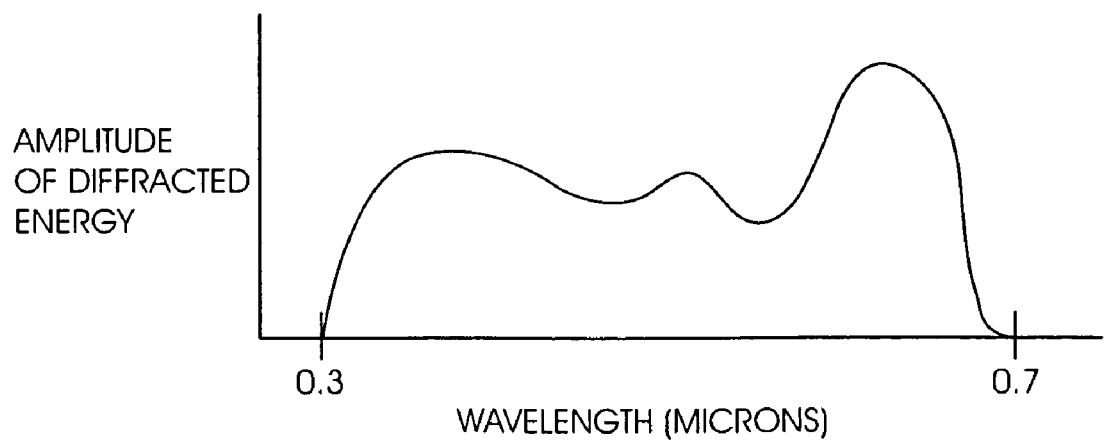
FIG. 7 is a graphic representation of the output of the spectrometer of the invention showing amplitude of reflected energy versus wavelength.

FIG. 7 is a graphical representation of one illustrative spectrometer output. In this case, the diffracted signals are identified by their wavelengths. The spectral characteristic determined is the amplitude or intensity of each diffracted signal. The result is a graph of the amplitude or intensity of diffracted energy as a function of wavelength. The output may be presented to the user in any other format desired, e.g., a table, a graph, or the like.

While the invention has been described with reference to a preferred embodiment, those skilled in the art will understand that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims. In this application all units are in the metric system and all amounts and percentages are by weight, unless otherwise expressly indicated. Also, all citations referred herein are expressly incorporated herein by reference.

I claim:

1. A method for measuring the spectral characteristics of an object from a formed object generated input signal, comprising the steps of:
    (a) directing an input signal onto a diffraction grating for forming diffracted signals;
    (b) directing said diffracted signals to a resonant mirror assembly for sequentially focusing a select diffracted signal at an output slit;
    (c) from said focused select diffracted signal, determining a spectral characteristic of said object;
    (d) associating each said spectral characteristic in step (c) with each said corresponding focused select diffracted signal in step (b); and
    (e) outputting said associated signals.

2. The method of claim 1 wherein said resonant mirror assembly comprises a resonant mirror having a pivot point, and a drive assembly actuable to oscillate said resonant mirror about said pivot point.

3. The method of claim 2 wherein said resonant mirror has an aspheric toroidal shape.

4. The method of claim 2 wherein said drive assembly comprises a magnet affixed to said resonant mirror and a coil electromagnetically associated with said magnet and energizable to effect oscillation of said resonant mirror about said pivot point.

5. The method of claim 4 wherein said coil of said drive assembly further comprises a first winding energizable to effect oscillation of said resonant mirror and a second winding energizable to determine the position of said resonant mirror assembly relative to said diffracted signals.

6. The method of claim 2 wherein said drive assembly comprises one or more of a stepper motor or linear actuator.

7. The method of claim 2 wherein said resonant mirror assembly comprises a position detector assembly having an ouput corresponding to the position of said resonant mirror.

8. The method of claim 7 wherein said position detector assembly comprises a light emitting diode for generating a position signal, a detector for receiving said position signal, and a reflector for transmitting said position signal from said LED to said detector.

9. The method of claim 1 further comprising the step of:
   (g) providing a processor for receiving, processing, storing, associating, and transmitting said spectral characteristics and said corresponding focused select diffracted signals.

10. The method of claim 1 wherein said step of outputting comprises generating one or more of optical or electrical signals.

11. An improved spectrometer for measuring the spectral characteristics of an object from an object generated input signal, comprising:
    (a) a fiber cable assembly for receiving an object generated input signal;
    (b) a diffraction grating positioned to receive said object generated input signal from said input and form diffracted signals;
    (c) a resonant mirror assembly for sequentially focusing a select diffracted signal from said diffraction grating at an output slit;
    (d) a sensor for sensing each said focused select diffracted signal; and
    (e) an analyzer for determining a spectral characteristic of said object from said focused select diffracted signal, said analyzer being coupled with said sensor for associating said sensed select diffracted signal with said spectral characteristic.

12. The spectrometer of claim 11 wherein said fiber cable assembly comprises a fiber cable, a GRIN lens, and an input slit.

13. The spectrometer of claim 11 wherein said resonant mirror assembly comprises resonant mirror having a pivot point, and a drive assembly actuable to oscillate said resonant mirror about said pivot point.

14. The spectrometer of claim 13 wherein said resonant mirror has an aspheric toroidal shape.

15. The spectrometer of claim 13 wherein said drive assembly comprises a magnet affixed to said resonant mirror and a coil electromagnetically associated with said magnet and energizable to effect oscillation of said resonant mirror about said pivot point.

16. The spectrometer of claim 15 wherein said coil of said drive assembly further comprises a first winding energizable to effect oscillation of said resonant mirror and a second winding energizable to determine the position of said resonant mirror assembly relative to said diffracted signals.

17. The spectrometer of claim 13 wherein said drive assembly comprises one or more of a stepper motor or linear actuator.

18. The spectrometer of claim 13 wherein said sensor is associated with said resonant mirror assembly and comprises a position detector assembly having an ouput corresponding to the position of said resonant mirror.

19. The spectrometer of claim 18 wherein said position detector assembly comprises a light emitting diode for generating a position signal, a detector for receiving said position signal, and a reflector for transmitting said position signal from said LED to said detector.

20. The spectrometer of claim 11 said analyzer comprises a processor for receiving, processing, storing, associating, and transmitting said spectral characteristics and said corresponding focused select diffracted signals.

* * * * *